United States Patent Office.

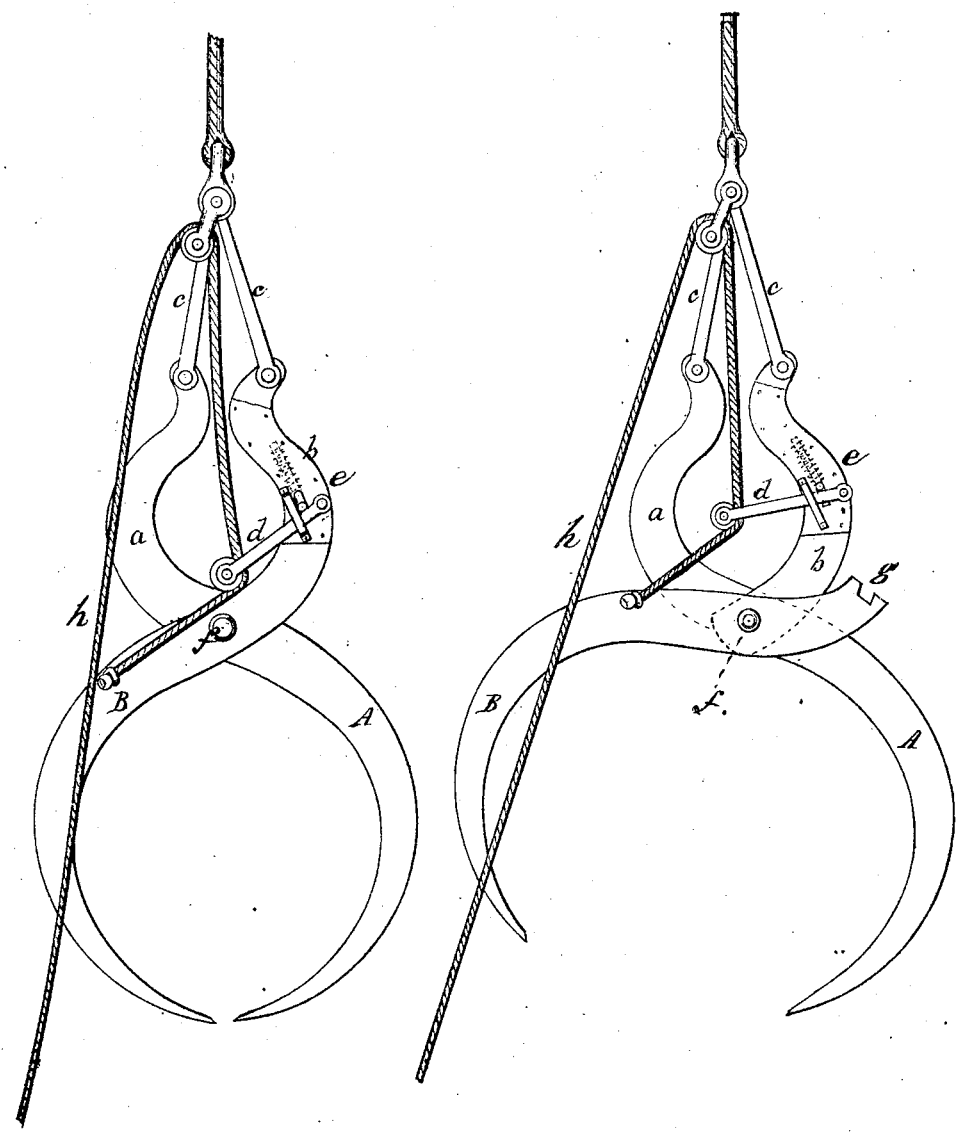

ELIJAH U. SCOVILLE, OF MANLIUS, NEW YORK.

Letters Patent No. 101,524, dated April 5, 1870.

IMPROVEMENT IN HORSE HAY-FORKS.

The Schedule referred to in these Letters Patent and making part of the same.

To all whom it may concern:

Be it known that I, ELIJAH U. SCOVILLE, of Manlius, in the county of Onondaga and State of New York, have invented a new and useful Improvement in Horse Hay-Forks; and I do hereby declare that the following is a full, clear, and exact description thereof, which will enable those skilled in the art to make and use the same, reference being had to the accompanying drawings forming part of this specification, in which—

Figure 1 shows the fork in a closed position, and
Figure 2 shows the same opened.

Similar letters of reference indicate like parts.

In the accompanying drawings—

A B are a pair of caliper-shaped tines, which are pivoted together at $f$, and have each an extension or arm, $b\ a$, extending above said pivot, and the said arms are connected to the hoisting-rope by links $c\ c$.

By this construction the tines of the fork are pressed together, and the hay clasped with such force that it cannot be shaken from the fork when the hay is being conveyed or switched off horizontally onto the mow or into the loft.

One tine is made in two parts, B $b$, as seen in fig. 2, so that the fork can be discharged readily.

All three parts A, B, and $b$ are pivoted together by a pivot, $f$, and the part $b$ is provided with a lock, which engages with a notch, $g$, in the upper end of B, to hold the parts $b$ B rigidly together, as shown in fig. 1, until the fork is to be discharged, which is done by the tripping-line $h$.

The lock $e$ is made as follows:

The arm $b$ is made of malleable cast-iron, and is cast with a cavity or large groove in it, and in this cavity is placed a sliding bar or detent.

The cavity is made long enough so that a spiral spring can be placed in the rear of the detent, and the cavity is then covered by fastening on a thin plate of sheet metal over it.

The detent has a stud or pin which projects through a slot in the covering-plate, and this pin being acted upon by the lever $d$, the detent is withdrawn and the fork discharged, and when the detent is again engaged, it is held secure in that position by the spiral spring at its rear end.

The tripping-line $h$ passes through the outer end of the discharging-lever $d$, and fastens to the tine B, and, at the same time that the lever rises to discharge the fork, the line $h$ is carried out from the center of motion $f$ by the lever, as seen in fig. 2, and the tine B is elevated and withdrawn from the hay by the same line that opens the discharging-lock $e$.

The links $c\ c$ can be substituted by a rope or chain, of about the same length as both of the links, the ends of the chain or rope being fastened to the arms $a\ b$, and the hoisting-rope being secured to the bight of the connecting-rope or chain.

Having thus described my invention,

What I claim as new, and desire to secure by Letters Patent, is—

The divided tine B $b$, constructed as described, the part $b$ having a recess, in which a spring detent is arranged, said detent being adapted to engage with a notch, $g$, in the part B, from which it is withdrawn by means of the tripping-rope, through the medium of the lever $d$, as set forth.

The above specification of my invention signed by by me this 24th day of January, 1870.

E. U. SCOVILLE.

Witnesses:
R. HIRSH,
F. A. MORLEY.